United States Patent
Hirohara

(10) Patent No.: US 9,821,652 B2
(45) Date of Patent: Nov. 21, 2017

(54) STRUCTURE FOR OPENING AND CLOSING FUEL FILLER OPENING

(71) Applicant: Yachiyo Industry Co., Ltd., Sayama-shi, Saitama (JP)

(72) Inventor: Takeshi Hirohara, Tochigi (JP)

(73) Assignee: YACHIYO INDUSTRY CO., LTD., Sayama-Shi (JP)

(*) Notice: Subject to any disclaimer, the term of this patent is extended or adjusted under 35 U.S.C. 154(b) by 0 days.

(21) Appl. No.: 15/036,262

(22) PCT Filed: Oct. 22, 2014

(86) PCT No.: PCT/JP2014/078052
§ 371 (c)(1),
(2) Date: May 12, 2016

(87) PCT Pub. No.: WO2015/072298
PCT Pub. Date: May 21, 2015

(65) Prior Publication Data
US 2016/0297297 A1    Oct. 13, 2016

(30) Foreign Application Priority Data
Nov. 15, 2013   (JP) .................. 2013-236567

(51) Int. Cl.
*B60K 15/05*    (2006.01)
*B60K 15/04*    (2006.01)

(52) U.S. Cl.
CPC ............. *B60K 15/05* (2013.01); *B60K 15/04* (2013.01); *B60K 2015/0461* (2013.01); *B60Y 2304/01* (2013.01)

(58) Field of Classification Search
CPC   B60K 15/04; B60K 15/05; B60K 2015/0461; B60Y 2304/01
USPC .................. 141/348–350; 220/86.1–86.2
See application file for complete search history.

(56) References Cited

U.S. PATENT DOCUMENTS

| | | | |
|---|---|---|---|
| 4,091,959 A * | 5/1978 | O'Banion | B60K 15/0406 220/304 |
| 5,730,194 A | 3/1998 | Foltz | |
| 6,539,990 B1 * | 4/2003 | Levey | B60K 15/0406 141/301 |

(Continued)

FOREIGN PATENT DOCUMENTS

| | | |
|---|---|---|
| EP | 2 322 373 A1 | 5/2011 |
| JP | 50-100427 | 8/1975 |

(Continued)

OTHER PUBLICATIONS

International Search Report, dated Jan. 13, 2015 (Jan. 13, 2015).
European Search Report dated May 15, 2017, 7 pages.

*Primary Examiner* — Nicolas A Arnett
(74) *Attorney, Agent, or Firm* — Rankin, Hill & Clark LLP

(57) ABSTRACT

A structure for opening and closing a fuel filler opening having a main flap and a dust flap that are opened or closed in accordance with insertion or removal of a fuel gun to a filler pipe. The dust flap is arranged at an outer end side with respect to the main flap, and is constituted by a plurality of flaps arranged flush with each other. The dust flap is opened such that ends of the respective flaps are separated from each other by the fuel gun inserted into the filler pipe.

2 Claims, 4 Drawing Sheets

(56) References Cited

U.S. PATENT DOCUMENTS

| | | | |
|---|---|---|---|
| 6,755,057 B2* | 6/2004 | Foltz | B60K 15/04 141/312 |
| 6,805,159 B2* | 10/2004 | Beaulne | B60K 15/04 137/588 |
| 6,983,773 B1* | 1/2006 | Hagano | B60K 15/04 141/348 |
| 7,147,019 B2* | 12/2006 | Walkowski | B60K 15/0406 141/301 |
| 7,246,642 B2* | 7/2007 | Foltz | B60K 15/04 141/285 |
| 7,461,673 B2* | 12/2008 | Busch | B60K 15/0406 141/348 |
| 8,167,010 B2* | 5/2012 | Yoshida | B60K 15/0406 141/231 |
| 8,430,140 B2* | 4/2013 | Ognjanovski | B60K 15/0406 141/350 |
| 8,807,369 B2* | 8/2014 | Sasaki | B60K 15/04 137/527 |
| 9,102,228 B2* | 8/2015 | Sasaki | B60K 15/04 |
| 9,174,530 B2* | 11/2015 | Hagano | B60K 15/0406 |
| 9,234,602 B2* | 1/2016 | Hagano | B60K 15/04 |
| 9,340,105 B2* | 5/2016 | Hagano | B60K 15/0406 |
| 9,415,679 B2* | 8/2016 | Frank | B60K 15/03006 |
| 9,434,248 B2* | 9/2016 | Hagano | B60K 15/05 |
| 9,499,046 B2* | 11/2016 | Saeki | B60K 15/0406 |
| 2003/0075221 A1* | 4/2003 | Beaulne | B60K 15/04 137/587 |
| 2006/0060581 A1* | 3/2006 | Foltz | B60K 15/04 220/265 |
| 2008/0087354 A1* | 4/2008 | Cisternino | B60K 15/0406 141/350 |
| 2008/0308180 A1* | 12/2008 | Baudoux | B60K 15/04 141/349 |
| 2009/0188582 A1* | 7/2009 | Hagano | B60K 15/04 141/349 |
| 2011/0079322 A1* | 4/2011 | Beier | B60K 15/0406 141/350 |
| 2011/0132905 A1* | 6/2011 | Ognjanovski | B60K 15/0406 220/86.2 |
| 2013/0340866 A1 | 12/2013 | Sasaki | |
| 2013/0341326 A1* | 12/2013 | Sasaki | B60K 15/04 220/203.06 |
| 2014/0284329 A1* | 9/2014 | Frank | B60K 15/03006 220/86.2 |
| 2014/0332530 A1* | 11/2014 | Groom | B60K 15/04 220/86.2 |
| 2015/0298541 A1* | 10/2015 | Bar | B60K 15/03519 220/86.2 |
| 2016/0185212 A1* | 6/2016 | Kito | B60K 15/04 220/86.2 |

FOREIGN PATENT DOCUMENTS

| | | |
|---|---|---|
| JP | 2007-261492 | 10/2007 |
| JP | 2012-162165 | 8/2012 |
| WO | 2008/032347 A1 | 3/2008 |

* cited by examiner

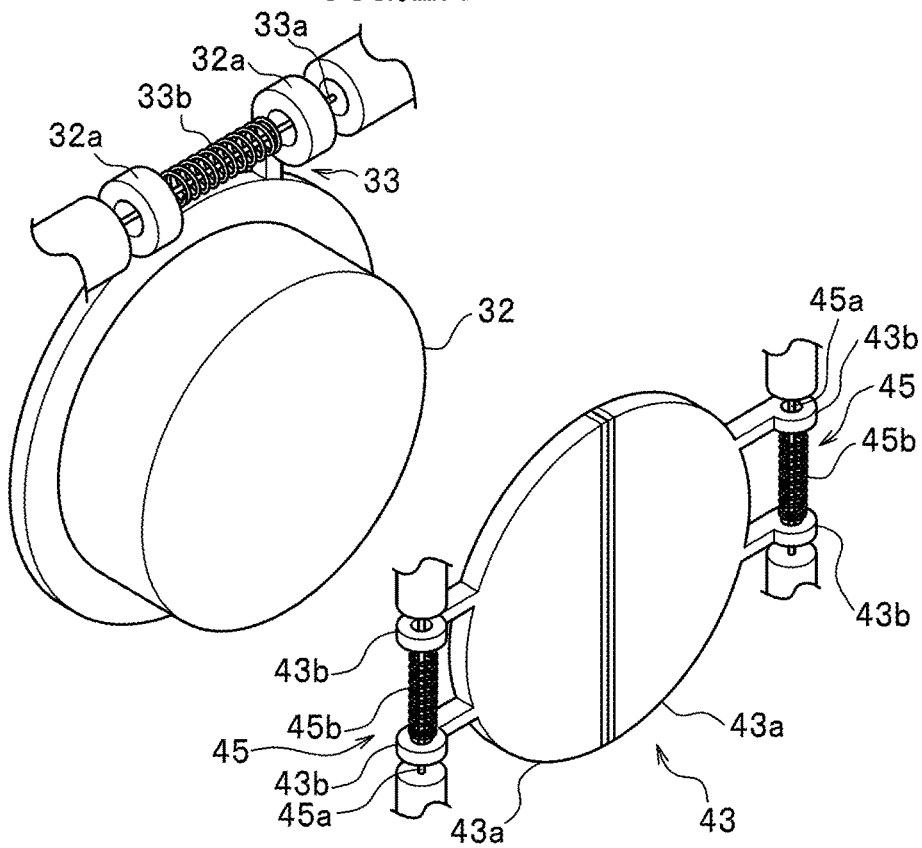
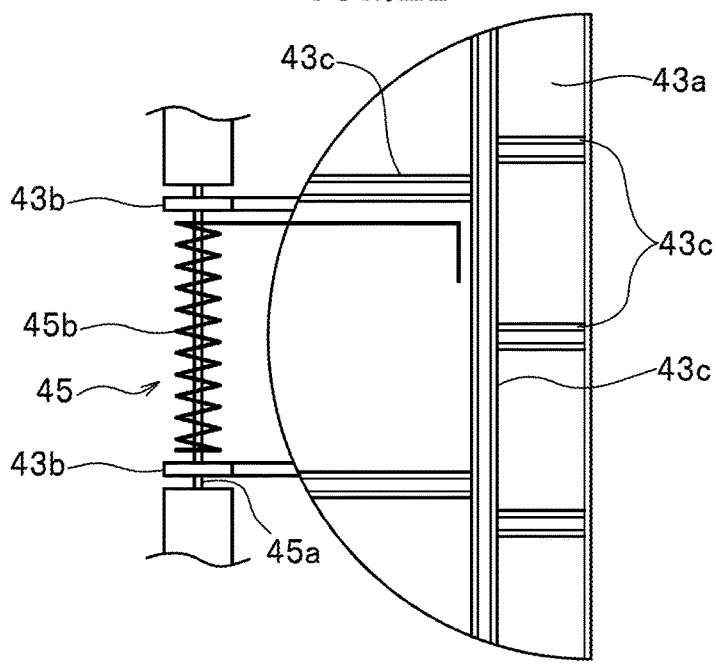

STRUCTURE FOR OPENING AND CLOSING FUEL FILLER OPENING

TECHNICAL FIELD

The present invention relates to a structure for opening and closing a fuel filler opening of a vehicle or the like.

BACKGROUND ART

Conventionally, as a structure for opening and closing a fuel filler opening of a filler pipe which communicates with a fuel tank of a vehicle or the like, for example, the invention disclosed in Patent Document 1 has been known. As shown in FIG. 6A, a structure for opening and closing a fuel filler opening 1 includes a cylindrical portion 3 having both ends opened, a main flap 4 and a dust flap 5 (a first valve device and a second valve device in Patent Document 1) arranged in the cylindrical portion 3. The main flap 4 and dust flap 5 are made as a single valve in a circular plate shape, respectively. The main flap 4 and dust flap 5 have a hinge 4a and a hinge 5a with springs, respectively, about which the flaps 4, 5 can be opened and closed.

The inner end of the cylindrical portion 3 is connected to a filler pipe 2, and a fuel filler opening 6 in an annular shape is connected to the outer end of the cylindrical portion 3. As shown in FIG. 6B, when a fuel gun 7 is inserted into the filler pipe 2, the fuel gun 7 pushes the main flap 4 and dust flap 5 open. On the other hand, as shown in FIG. 6A, when the fuel gun 7 is removed from the fuel filler opening 6, the flaps 4, 5 are closed respectively by the springs of the hinges 4a, 5a under the restoring force.

PRIOR ART DOCUMENT

Patent Document

Patent Document 1: Japanese Patent Application Publication 2012-162165

DISCLOSURE OF INVENTION

Problem to be Solved by the Invention

The dust flap 5 of the structure for opening and closing a fuel filler opening 1 is a single valve in a circular plate shape, which causes a distance L1 from the hinge 5a to a contact point P between the opened dust flap 5 and the fuel gun 7 to be longer. Therefore, the distance from the main flap 4 to the dust flap 5 needs to be set long, causing the larger size of the structure for opening and closing a fuel filler opening.

The present invention is made in view of the problem above and provides a structure for opening and closing a fuel filler opening which can reduce the size thereof.

Means for Solving the Problem

A structure for opening and closing a fuel filler opening having a main flap and a dust flap which are opened or closed in accordance with insertion or removal of a fuel gun to a filler pipe, wherein the dust flap is arranged at an outer end side with respect to the main flap and is constituted by a plurality of flaps in a plate shape arranged in the same plane, the main flap and each flap of the dust flap contact to support the fuel gun when the fuel gun is inserted, and a first contact point at which the main flap is in contact with the fuel gun is positioned between neighboring two second contact points at which each flap of the dust flap is in contact with the fuel gun, when the main flap and the dust flap are seen from a fuel filler opening side.

According to the configuration, respective flaps constituting the dust flap can be reduced in size, allowing the length from the dust flap to the main flap can be relatively shorter than that of the conventional structure for opening and closing a fuel filler opening. Accordingly, the structure for opening and closing a fuel filler opening can be reduced in size.

According to the configuration, the main flap and each flap of the dust flap are in contact at least three points on the outer circumferential face of the inserted fuel gun. Accordingly, the fuel gun is supported stably.

Further, each flap of the dust flap includes a hinge portion having an urging member, and ends of the respective flaps are opened to be separated from each other against urging force of the urging member to support the fuel gun by the respective flaps when the fuel gun is inserted into the fuel filler opening.

Effect of the Invention

According to a structure for opening and closing a fuel filler opening of the present invention, the structure is reduced in size.

BRIEF DESCRIPTION OF DRAWINGS

FIG. 2A is a perspective view showing a main flap and a dust flap;

FIG. 2B is a perspective view showing a dust flap;

FIG. 2C is a structure diagram of a face of the dust flap at the main flap side;

BEST MODE FOR CARRYING OUT THE INVENTION

Hereinafter, an embodiment of the present invention will be described with reference to the drawings.

Configuration of Embodiment

Figure 1:
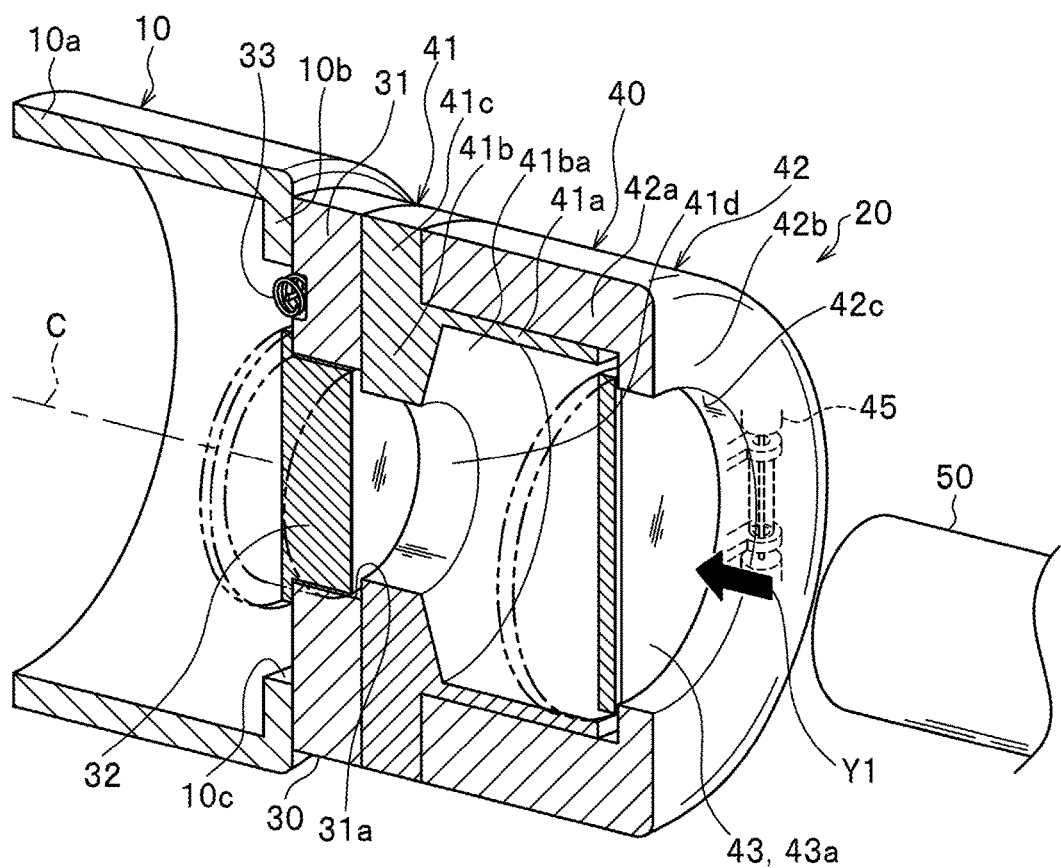
FIG. 1 is a perspective cross-sectional view showing a structure for opening and closing a fuel filler opening according to the present invention.

As shown in FIG. 1, a structure for opening and closing a fuel filler opening 20 according to the present invention is connected to the outer end of a filler pipe 10 in a circular tube shape which communicates with a fuel tank (not shown) of a vehicle or the like. In the following description, it is noted that a fuel tank side is referred to as an "inner end side" and the opposite side of the fuel tank side is referred to as an "outer end side" with respect to the structure for opening and closing a fuel filler opening 20.

The filler pipe 10 is constituted by a main pipe portion 10a in a cylindrical shape and an edge portion 10b formed at the outer end of the main pipe portion 10a. The edge portion 10b is formed perpendicular to the main pipe portion 10a. The edge portion 10b in an annular shape has an opening portion 10c at the center.

The structure for opening and closing a fuel filler opening 20 is mainly constituted by a main flap portion 30 attached on the end face of the edge portion 10b and a dust flap portion 40 attached on the main flap portion 30. The main flap portion 30 is attached with a main flap 32, and the dust flap portion 40 is attached with a dust flap 43.

The main flap portion 30 is constituted by a body portion 31, the main flap 32 and a hinge portion 33. The material of the body portion 31 and the main flap 32 is not particularly limited, and they are formed of a resin in the present embodiment. The body portion 31 is in an annular shape and has an opening portion 31a at the center. The opening portion 31a is in communication with the opening portion 10c.

The main flap 32 is a member in a circular plate shape to open and close the opening portion 31a. The main flap 32 opens or closes the opening portion 31a in accordance with insertion or removal of a fuel gun 50. Thus, when fueling is not performed, the opening portion 31a is closed to prevent leakage of vapor of the fuel. The shape of the main flap 32 is not particularly limited as long as it can open and close the opening portion 31a, and is in a hat-shaped cross section in the present embodiment. The main flap 32 is rotatable about the hinge portion 33.

The hinge portion 33 serves to connect the body portion 31 with the main flap 32, and to open and close the main flap 32 with respect to the opening portion 31a. As shown in FIG. 2A, the hinge portion 33 is constituted by a shaft 33a and a coil spring 33b. The shaft 33a is inserted through a pair of attachment hole portions 32a formed on the outer periphery of the main flap 32 to be bridged on a part of the body portion 31. Accordingly, the main flap 32 is rotatable about the axis of the shaft 33a.

The coil spring 33b is inserted through the shaft 33a arranged between the pair of attachment hole portions 32a. One end of the coil spring 33b is in contact with the shaft 33a, and the other end is in contact with the main flap 32. The coil spring 33b urges the main flap 32 to come into contact with the body portion 31 when no external force acts on the main flap 32.

As shown in FIG. 1, the dust flap portion 40 is constituted by an inner attachment portion 41, an outer attachment portion 42, the dust flap 43 and a hinge portion 45, 45. The inner attachment portion 41 includes a cylindrical body portion 41a in a cylindrical shape, an inner flange portion 41b extending toward the axial center C and an outer flange portion 41c extending away from the axial center C at the inner end side of the cylindrical body portion 41a.

The inner flange portion 41b is in an annular shape and is formed with an opening portion 41d at the center. The opening portion 41d is in communication with the opening portions 10c, 31a. An end face 41ba of the inner flange portion 41b at the outer end side is inclined toward the inner end side as the end face 41ba comes closer to the axial center C. The outer flange portion 41c has the same outer diameter as that of the body portion 31.

The outer attachment portion 42 is constituted by a cylindrical body portion 42a in a cylindrical shape and an edge portion 42b arranged at the outer end of the cylindrical body portion 42a. The cylindrical body portion 42a is fitted on the outer circumferential face of the cylindrical body portion 41a, and the end face at the inner end side is in contact with the outer flange portion 41c. The cylindrical body portion 42a has the same outer diameter as that of the outer flange portion 41c. The end of the cylindrical body portion 42a at the outer end extends further toward outside than the end of the cylindrical body portion 41a.

The edge portion 42b is formed perpendicularly to the cylindrical body portion 42a. The edge portion 42b is in an annular shape and has an opening portion 42c at the center. The opening portion 42c is in communication with the opening portions 10c, 31a and 41d, respectively. The opening portion 42c serves as a "fuel filler opening" into which the fuel gun 50 is inserted. It is noted that the size of each opening portion is not particularly limited, and the opening portions 41d, 31a, 42c, 10c are getting larger in this order in the present invention.

The dust flap 43 is a member used for opening or closing the opening portion 42c in accordance with insertion or removal of the fuel gun 50. When fueling is not performed, the dust flap 43 is closed to prevent outside dust from coming in. The dust flap 43 is, in the present embodiment, constituted by semi-circular flaps 43a, 43a. The semi-circular flaps 43a are semi-circular plate members and are arranged in the same plane to face with each other. The semi-circular flaps 43a, 43a can rotate about the hinge portions 45, 45, respectively. Since the semi-circular flaps 43a, 43a are arranged in the same plane to face with each other, ends of the semi-circular flaps 43a, 43a are separated away from each other to be opened (double swinging) when the fuel gun 50 is inserted through the semi-circular flaps 43a, 43a.

As shown in FIG. 2C, a plurality of ribs 43c are formed vertically on faces at the inner end side of the semi-circular flaps 43a, 43a. The ribs 43c extend in the vertical/horizontal direction, respectively. Forming the ribs 43c enhances the semi-circular flap 43a in rigidity.

The hinge portions 45, 45 are installed on the inner end side of the edge portion 42b, and are arranged in parallel having the opening portion 42c therebetween. Each hinge portion 45 connects the edge portion 42b to the semi-circular flap 43a and opens/closes the semi-circular flap 43a over the opening portion 42c. As shown in FIG. 2B, the hinge portion 45 is constituted by a shaft 45a and a coil spring 45b. The shaft 45a is inserted in a pair of attachment hole portions 43b, 43b provided on the outer circumference of the semi-circular flap 43a to extend over a part of the edge portion 42b. Accordingly, the semi-circular flap 43a can rotate about the axis of the shaft 45a.

The coil spring 45b is inserted through the shaft 45a between the pair of attachment hole portions 43b. One end of the coil spring 45b is in contact with the shaft 45a, and the other end thereof is in contact with the semi-circular flap 43a. The coil spring 45b is an urging member which urges the semi-circular flap 43a to contact the edge portion 42b when no external force acts on the semi-circular flap 43a.

Operation in Embodiment

Figure 3:
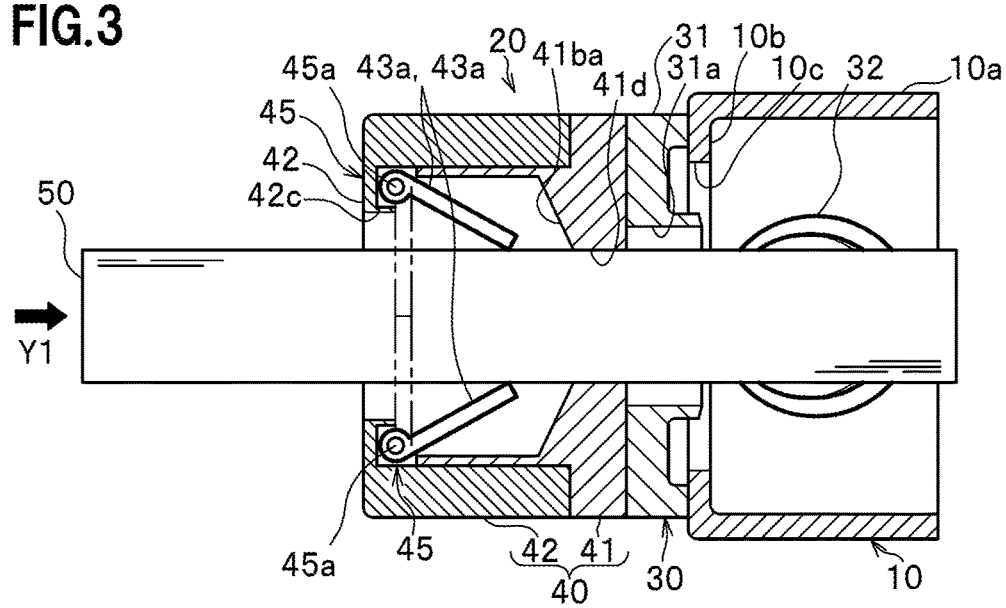
FIG. 3 is a cross-sectional view showing a state where a fuel gun is inserted in the structure for opening and closing a fuel filler opening of the present invention.

Next, a description will be given of an operation at the time of fuel supply via the structure for opening and closing a fuel filler opening 20 of the present embodiment. When fuel is supplied, as shown by an arrow Y1 in FIG. 1, the fuel gun 50 is inserted through the opening portion (fuel filler opening) 42c so that the end of the fuel gun 50 reaches the filler pipe 10. In this case, as shown in FIG. 3, the semi-circular flaps 43a, 43a are pressed by the fuel gun 50 with greater force than the urging force of the hinge portions 45, which swingingly opens both the semi-circular flaps 43a, 43a toward the main flap 32. Further, the main flap 32 is pushed by the fuel gun 50 with greater force than the urging force of the hinge portion 33, which opens the main flap 32 toward the fuel tank (not shown).

When fueling is complete, the fuel gun 50 is pulled out from the opening portion (fuel filler opening) 42c. Accordingly, the external force does not act on the main flap 32 anymore, so that the main flap 32 is closed by the urging force of the hinge portion 33 to quickly close the opening portion 31a. Similarly, the external force does not act on the semi-circular flaps 43a anymore, so that the semi-circular flaps 43a, 43a is closed by the urging force of the hinge portions 45, 45 to close the opening portion 42c.

Figure 4:
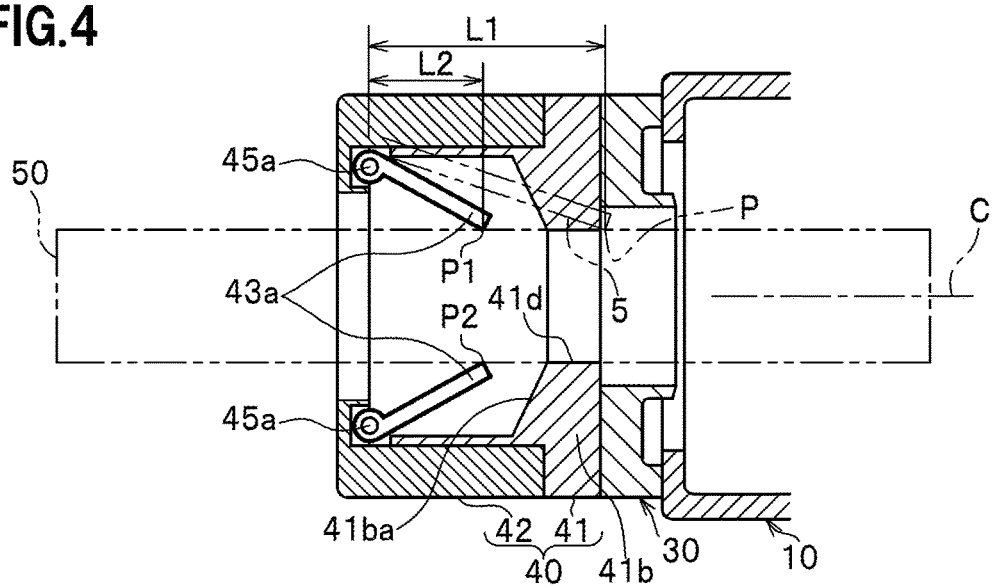
FIG. 4 is a cross-sectional view showing a difference in length in a movable direction of the dust flaps of the present invention and the dust flap of a prior art.

According to the structure for opening and closing a fuel filler opening 20 described above, the semi-circular flaps 43a constituting the dust flap 43 is reduced in size, shortening the length from the dust flap 43 to the main flap 32, in comparison with the conventional structure for opening and closing a fuel filler opening 1. Here, in FIG. 4, contact points between the fuel gun 50 and the semi-circular flaps 43a, 43a are set as contact points P1, P2. In the conventional structure for opening and closing a fuel filler opening 1, the length L1 from the hinge portions 45 to the contact point P is necessary, whereas, in the present embodiment, a length L2 from the hinge portions 45 to the contact points P1, P2 is sufficient. Thus, the length in the axial direction of the dust flap portion 40 can be approximately half. In short, according to the present embodiment, the structure for opening and closing a fuel filler opening 20 is reduced in size.

Figure 5:
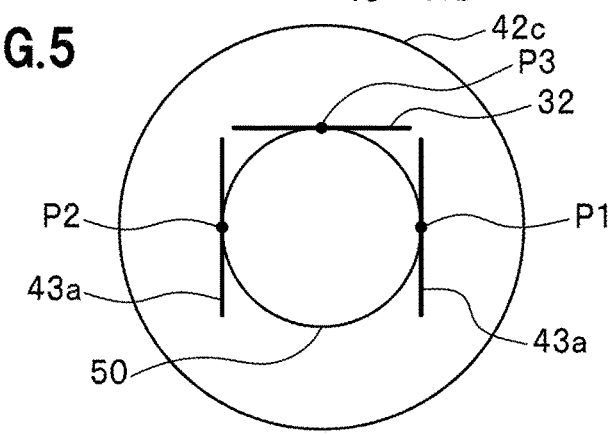
FIG. 5 is a schematic diagram seen from the fuel filler opening showing a state where the fuel gun is inserted in the structure for opening and closing a fuel filler opening of the present invention.
Figure 6A:
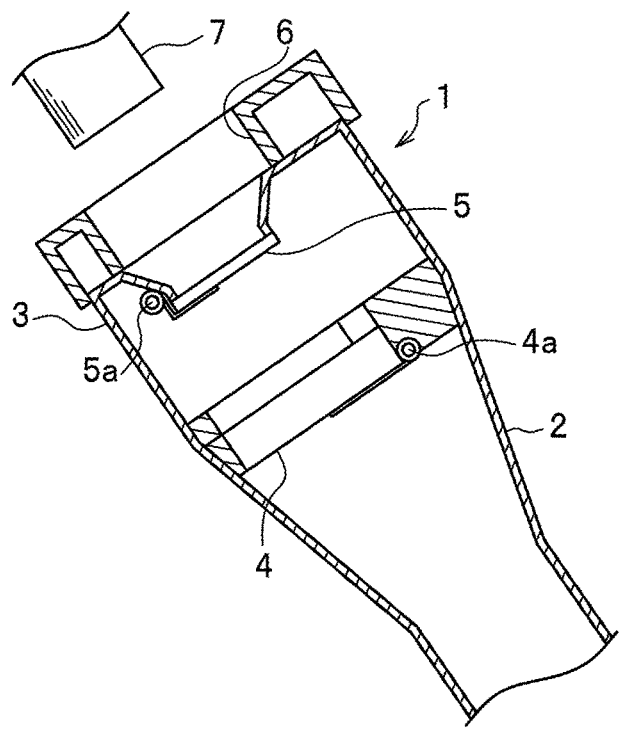
FIG. 6A is a diagram showing a structure for opening and closing a fuel filler opening according to the prior art.
Figure 6B:
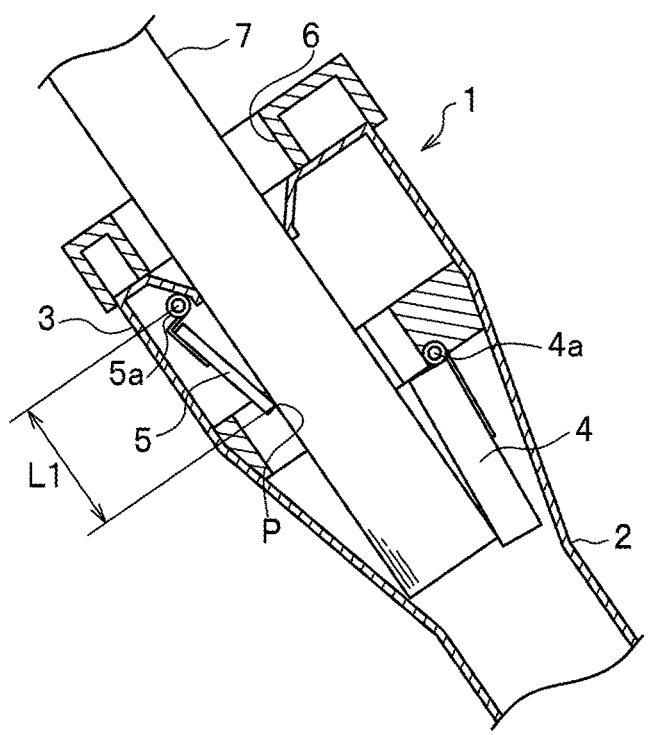
FIG. 6B is a diagram showing a state where the fuel gun is inserted in the structure for opening and closing a fuel filler opening shown in FIG. 6A.

Further, as shown in FIG. 5, when viewed from the opening portion (fuel filler opening) 42c side, the outer circumferential face of the inserted fuel gun 50 is in contact with the main flap 32 and the semi-circular flaps 43a, 43a on the three points which are contact points P1, P2 and P3. As a result, the fuel gun 50 can be supported in a stable manner.

In addition, the end face 41ba of the inner flange portion 41b at the outer end side is inclined toward the inner end side as the end face 41ba comes closer to the axial center C. Accordingly, when the fuel gun 50 is inserted, the end of the fuel gun 50 can easily be guided into the opening portion 41d.

The embodiment of the present invention has been described above, but the present invention can be appropriately changed in design without departing from the spirit of the present invention. For example, in the present embodiment, the dust flap 43 is constituted by the two flaps, but may be constituted by the number of n flaps (n is an integer equal to or more than 3) having a fan shape in plan view. In this case, the flaps are in contact with the fuel gun 50 at contact points Pn positioned at n locations. The contact point (first contact point) P3 between the main flap 32 and the fuel gun 50 is preferably positioned between neighboring contact points Pn (second contact points). Accordingly, when viewed from the opening portion (fuel filler opening), the fuel gun 50 can be contacted with the main flap 32 and the dust flap 43 at (n+1) locations, allowing the fuel gun 5 to be supported in a stable manner.

DESCRIPTION OF REFERENCE NUMERALS 10 filler pipe
20 structure for opening and closing a fuel filler opening
30 main flap portion
32 main flap
33 hinge portion
33a shaft
33b coil spring
40 dust flap portion
43 dust flap
43a semi-circular flap
45 hinge portion
45a shaft
45b coil spring
50 fuel gun

The invention claimed is:

1. A structure for opening and closing a fuel filler opening comprising a main flap and a dust flap that are opened or closed in accordance with insertion or removal of a fuel gun to a filler pipe,
   wherein the dust flap is arranged at an outer end side with respect to the main flap and is constituted by a plurality of flaps in a flat plate shape arranged in the same plane, and each of the plurality of flaps of the dust flap includes a hinge portion having an urging member at a base end,
   a distal end of each flap of the dust flap is opened toward the main flap from the hinge portion as a supporting point against urging force of the urging member, and the main flap and each of the plurality of flaps of the dust flap contact to support the fuel gun when the fuel gun is inserted into a fuel filler opening, and
   a first contact point at which the main flap is in contact with the fuel gun is positioned between neighboring two second contact points at which each flap of the dust flap is in contact with the fuel gun, when the main flap and the dust flap are seen from a fuel filler opening side.

2. The structure for opening and closing a fuel filler opening according to claim 1, wherein a rib is formed on each flap of the dust flap.

* * * * *